No. 876,475.

PATENTED JAN. 14, 1908.

A. D. MORGAN.
EMERGENCY BRAKE FOR MOTOR VEHICLES.
APPLICATION FILED FEB. 1, 1907.

WITNESSES:
G. A. Higgins
C. C. Roos.

INVENTOR:
Alexander D. Morgan
by Browne & Woodworth
Atty's.

UNITED STATES PATENT OFFICE.

ALEXANDER D. MORGAN, OF WEST ROXBURY, MASSACHUSETTS.

EMERGENCY-BRAKE FOR MOTOR-VEHICLES.

No. 876,475.　　　　Specification of Letters Patent.　　　　Patented Jan. 14, 1908.

Application filed February 1, 1907. Serial No. 355,226.

*To all whom it may concern:*

Be it known that I, ALEXANDER D. MORGAN, a citizen of the United States, and a resident of West Roxbury, in the county of Suffolk and State of Massachusetts, have invented a new and useful Improvement in Emergency-Brakes for Motor-Vehicles, of which the following is a specification.

My invention relates to brakes for vehicles, and especially to emergency brakes for motor vehicles.

The object of my invention is to produce an emergency brake for a vehicle, and especially for a motor vehicle, which shall be certain and positive in action, and by which the vehicle may be almost instantly stopped when necessary, as for example, when owing to the condition of the road-way, brakes of the ordinary type are not effective.

My invention will be described in connection with the drawings which accompany and form a part of this specification and which illustrates one embodiment thereof; although it will be understood by those skilled in the art that many modifications may be made in the particular embodiment which I shall specifically describe for the purpose of more fully disclosing my invention, without departing from the principle thereof.

Figure 1:
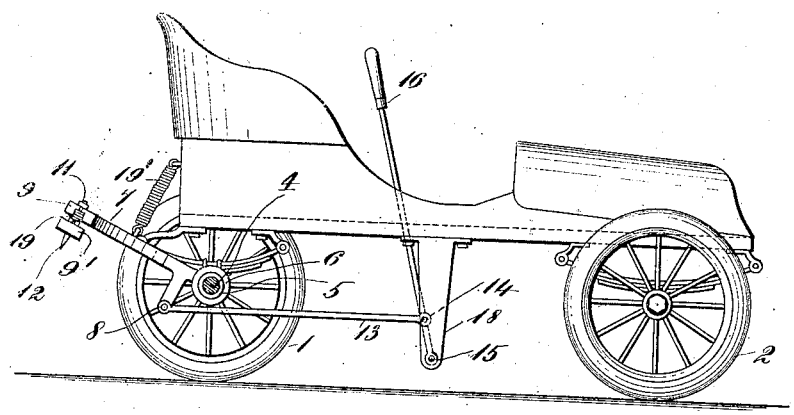
Figure 2:
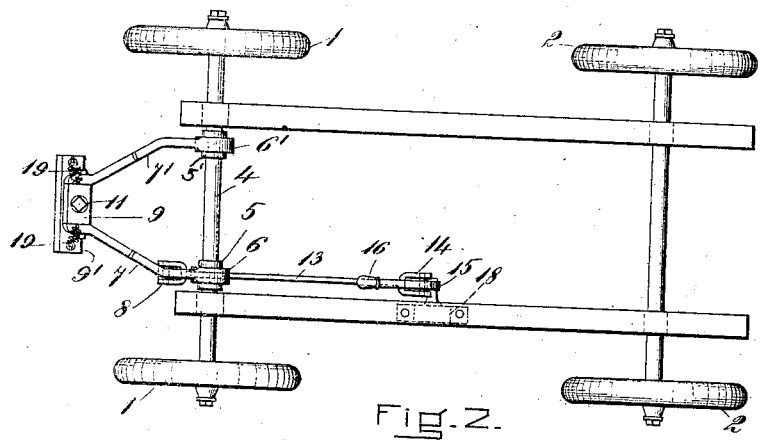
Figure 3:
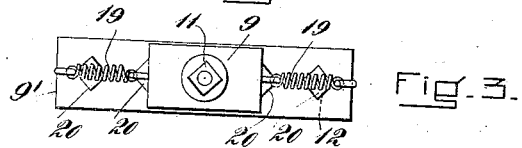
Figure 4:
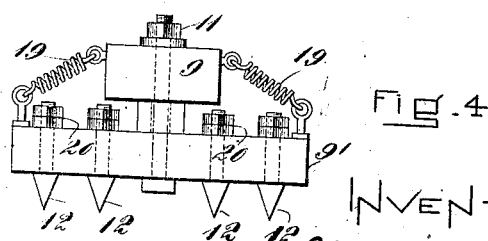

In the drawings Figure 1 is an elevation partly in section of a motor vehicle applied with my emergency brake. Fig. 2 is a plan view of the motor vehicle shown in Fig. 1 with the vehicle bed removed. Fig. 3 is a plan view of a detail of construction, 'and Fig. 4 is an end elevation thereof.

In the figures, 1, 2, represent the wheels of a motor vehicle secured in the usual manner to the axles. The frame 7 7' is pivotally secured to some suitable portion of the vehicle and as herein shown is pivotally secured to the casing 4 of the rear axle in the bearings 5 5', the bosses 6 6' in which the two members of said frame terminate embracing said casing 4. The rack or drag 9' is pivotally secured by a substantially vertically arranged bolt or pin 11, or other suitable means to the end portion 9 of the aforesaid frame and may as shown be provided with a series of teeth 12 detachably secured therein by means of nuts and lock nuts 20, 20, so that if desired, said teeth may be withdrawn up into the body of the drag 9' or else removed therefrom. In order to maintain the drag normally parallel to the rear axle of the vehicle the springs 19, 19, having their ends secured to the drag and to the end of the frame 9, are provided. The springs 19' having their ends secured to the body of the vehicle and to the members 7 7' of the frame, normally maintain the latter in elevated position as shown. A lever 16 is pivoted at 15 to a suitable portion of the vehicle, as for example the depending lug 18, and is operatively connected with the frame 7 7' by means of the connecting rod 13 pivoted at 14 to said lever and at 8 to a lug preferably formed integral with the member 7 of the frame.

As will be obvious, the forward movement of the lever 16 will lower the frame and cause the brake 9' to come in contact with the road-way so as to retard the speed of the vehicle.

The chief use of the invention hereinbefore described is to prevent a motor vehicle, traveling at rapid speed, from skidding when the usual brakes are applied in the usual manner and the condition of the road-way will not permit such application of the brakes to bring the vehicle to a full stop, as for example when the course of the vehicle is suddenly changed. Under these conditions, as will be obvious, as soon as the drag is brought into contact with the earth the pivotal connection of said drag with the end of the frame 9 will enable the drag to assume a position substantially at right angles to the direction of the motion of the rear part of the vehicle, thereby greatly increasing the effectiveness of the emergency brake in quickly stopping the progress of the vehicle. As soon as the progress of the vehicle is stopped, the action of the spring 19' will bring the frame to its normal position and the action of the springs 19 will cause the drag to resume its normal position with respect to the end of the frame 9.

I claim:

1. The combination with a vehicle, of an emergency brake comprising a frame pivotally attached to said vehicle, a drag pivotally attached to said frame by a substantially vertically arranged pin and maintained substantially parallel to the rear axle of said vehicle, and means under the control of the driver for lowering said frame whereby said drag is brought into contact with the road-way over which said vehicle is traveling.

2. The combination with a vehicle, of an emergency brake comprising a frame pivotally attached to said vehicle, a drag pivotally attached to said frame by a substantially vertically arranged pin and maintained substantially parallel to the rear axle of said vehicle, means under the control of the driver for lowering said frame whereby said drag is brought into contact with the road-way over which said vehicle is traveling, and means for automatically returning said frame to its normal position.

3. The combination with a vehicle, of an emergency brake comprising a frame pivotally attached to said vehicle, a drag pivotally attached to said frame by a substantially vertically arranged pin and maintained substantially parallel to the rear axle of said vehicle, a series of teeth passing through said drag, and means under control of the driver for lowering said frame whereby said drag is brought into contact with the road-way over which the vehicle is traveling.

4. The combination with a vehicle, of an emergency brake comprising a frame pivotally attached to said vehicle, a drag pivotally attached to said frame by a substantially vertically arranged pin and maintained substantially parallel to the rear axle of said vehicle, a series of teeth passing through said drag, means for adjusting and securing said teeth in position, and means under control of the driver for lowering said frame whereby said drag is brought into contact with the road-way over which said vehicle is traveling.

5. The combination with a vehicle, of an emergency brake comprising a frame pivotally attached to said vehicle, a drag pivotally attached to said frame, means maintaining said drag in a position substantially parallel to the rear axle of said vehicle, and means under the control of the driver for lowering said frame whereby said drag is brought into contact with the roadway over which said vehicle is traveling.

6. The combination with a vehicle, of an emergency brake comprising a frame pivotally attached to said vehicle, a drag associated with said frame and so constructed and arranged as to be capable of rotational movement in a substantially horizontal plane when said frame is lowered, means maintaining said drag substantially parallel to the rear axle of said vehicle and means under control of the driver for lowering said frame and thereby bringing said drag in contact with the roadway over which said vehicle is traveling.

7. The combination with a vehicle, of an emergency brake comprising a frame pivotally attached to said vehicle, a drag associated with said frame and arranged to assume a position substantially at right angles to the direction of motion of the rear part of said vehicle when brought into contact with the roadway over which said vehicle is traveling, and means under the control of the driver for lowering said frame whereby said drag is brought into contact with said roadway.

8. The combination with a vehicle, of an emergency brake comprising a frame capable of vertical movement with respect to said vehicle, a drag horizontally rotatable with respect to said frame and maintained substantially at right angles to the direction of motion of the rear part of said vehicle, and means under the control of the driver for lowering said frame and thereby bringing said drag into contact with the roadway over which said vehicle is traveling.

In testimony whereof, I have hereunto subscribed my name this 29th day of January 1907.

ALEXANDER D. MORGAN.

Witnesses:
 CHARLES C. READ,
 GEO. K. WOODWORTH.